(12) United States Patent
Kimball et al.

(10) Patent No.: US 8,350,411 B2
(45) Date of Patent: Jan. 8, 2013

(54) MODULAR SYSTEM FOR UNATTENDED ENERGY GENERATION AND STORAGE

(75) Inventors: Jonathan W. Kimball, Mahomet, IL (US); Philip T. Krein, Champaign, IL (US); Nicholas D. Benavides, Champaign, IL (US)

(73) Assignee: SolarBridge Technologies, Inc., Austin, TX (US)

( * ) Notice: Subject to any disclaimer, the term of this patent is extended or adjusted under 35 U.S.C. 154(b) by 0 days.

(21) Appl. No.: 13/092,916

(22) Filed: Apr. 23, 2011

(65) Prior Publication Data

US 2011/0199044 A1 Aug. 18, 2011

Related U.S. Application Data

(63) Continuation of application No. 11/615,074, filed on Dec. 22, 2006, now Pat. No. 7,994,657.

(51) Int. Cl.
*H02J 9/00* (2006.01)

(52) U.S. Cl. ............................................ 307/64

(58) Field of Classification Search ...................... 307/64
See application file for complete search history.

(56) References Cited

U.S. PATENT DOCUMENTS

| | | | |
|---|---|---|---|
| 3,670,230 A | 6/1972 | Rooney et al. | |
| 4,651,265 A | 3/1987 | Stacey et al. | |
| 4,661,758 A * | 4/1987 | Whittaker | 320/101 |
| 5,343,380 A | 8/1994 | Champlin | |
| 5,668,464 A | 9/1997 | Krein et al. | |
| 6,046,402 A * | 4/2000 | More | 136/248 |
| 6,154,379 A | 11/2000 | Okita | |
| 6,489,755 B1 | 12/2002 | Beaudreaux et al. | |
| 6,750,391 B2 | 6/2004 | Bower et al. | |
| 6,950,323 B2 | 9/2005 | Achleitner et al. | |
| 7,031,176 B2 | 4/2006 | Kotsopoulos et al. | |
| 7,072,195 B2 | 7/2006 | Xu | |

(Continued)

FOREIGN PATENT DOCUMENTS

CA 2353422 C 3/2004

(Continued)

OTHER PUBLICATIONS

Kjaer et al., "A Review of Single-phase Grid-connected Inverters for Photovoltaic Modules," IEEE Trans on Power Electronics, vol. 41, No. 5, pp. 1292-1306, 2005.

(Continued)

*Primary Examiner* — Robert L. Deberadinis
(74) *Attorney, Agent, or Firm* — Barnes & Thornburg LLP (57) ABSTRACT

An apparatus and method for supplying energy to a load includes an energy recharge unit, an energy storage unit, an energy converter connected to the energy recharge unit, the energy converter being capable of transferring energy at a power level from the energy recharge unit to an output node, the power level being determined by a power transfer controller, and a bi-directional energy converter connected to the energy storage unit and to the output node. The bi-directional energy converter is capable of converting energy of varying voltages from the energy storage unit to energy of varying current levels to supplement the transferred energy with energy from the energy storage unit so as to maintain a constant voltage on the output node. The bi-directional energy converter is capable of converting the transferred energy to provide charging energy to the energy storage unit when the transferred energy exceeds a demand level of the load while maintaining the constant voltage at the output node.

20 Claims, 5 Drawing Sheets

U.S. PATENT DOCUMENTS

| | | | |
|---|---|---|---|
| 7,091,707 B2 | 8/2006 | Cutler | |
| 7,193,872 B2 | 3/2007 | Siri | |
| 7,233,130 B1 | 6/2007 | Kay | |
| 7,289,341 B2 | 10/2007 | Hesterman | |
| 7,319,313 B2 | 1/2008 | Dickerson et al. | |
| 7,324,361 B2 | 1/2008 | Siri | |
| 7,339,287 B2 | 3/2008 | Jepson et al. | |
| 7,365,998 B2 | 4/2008 | Kumar et al. | |
| 7,420,354 B2 | 9/2008 | Cutler | |
| 7,432,691 B2 | 10/2008 | Cutler | |
| 7,463,500 B2 | 12/2008 | West | |
| 7,521,914 B2 | 4/2009 | Dickerson et al. | |
| 7,531,993 B2 | 5/2009 | Udrea et al. | |
| 7,551,460 B2 | 6/2009 | Lalithambika et al. | |
| 7,577,005 B2 | 8/2009 | Angerer et al. | |
| 7,592,789 B2 | 9/2009 | Jain | |
| 7,609,040 B1 | 10/2009 | Jain | |
| 7,626,834 B2 | 12/2009 | Chisenga et al. | |
| 7,646,116 B2 | 1/2010 | Batarseh et al. | |
| 7,660,139 B2 | 2/2010 | Garabandic | |
| 7,667,610 B2 | 2/2010 | Thompson | |
| 7,710,752 B2 | 5/2010 | West | |
| 7,733,679 B2 | 6/2010 | Luger et al. | |
| 7,768,155 B2 | 8/2010 | Fornage | |
| 7,796,412 B2 | 9/2010 | Fornage | |
| RE41,965 E | 11/2010 | West | |
| 7,839,022 B2* | 11/2010 | Wolfs | 307/77 |
| RE42,039 E | 1/2011 | West et al. | |
| 7,899,632 B2 | 3/2011 | Fornage et al. | |
| 7,916,505 B2 | 3/2011 | Fornage | |
| 2001/0043050 A1* | 11/2001 | Fisher, Jr. | 320/101 |
| 2007/0040539 A1 | 2/2007 | Cutler | |
| 2007/0040540 A1* | 2/2007 | Cutler | 323/283 |
| 2007/0133241 A1 | 6/2007 | Mumtaz et al. | |
| 2007/0221267 A1 | 9/2007 | Fornage | |
| 2008/0055952 A1 | 3/2008 | Chisenga et al. | |
| 2008/0106921 A1 | 5/2008 | Dickerson et al. | |
| 2008/0203397 A1 | 8/2008 | Amaratunga et al. | |
| 2008/0266922 A1 | 10/2008 | Mumtaz et al. | |
| 2008/0272279 A1 | 11/2008 | Thompson | |
| 2008/0283118 A1 | 11/2008 | Rotzoll et al. | |
| 2008/0285317 A1 | 11/2008 | Rotzoll | |
| 2008/0304296 A1 | 12/2008 | NadimpalliRaju et al. | |
| 2009/0000654 A1 | 1/2009 | Rotzoll et al. | |
| 2009/0020151 A1 | 1/2009 | Fornage | |
| 2009/0066357 A1 | 3/2009 | Fornage | |
| 2009/0079383 A1 | 3/2009 | Fornage et al. | |
| 2009/0080226 A1 | 3/2009 | Fornage | |
| 2009/0084426 A1 | 4/2009 | Fornage et al. | |
| 2009/0200994 A1 | 8/2009 | Fornage | |
| 2009/0225574 A1 | 9/2009 | Fornage | |
| 2009/0230782 A1 | 9/2009 | Fornage | |
| 2009/0242272 A1 | 10/2009 | Little et al. | |
| 2009/0244947 A1 | 10/2009 | Fornage | |
| 2009/0296348 A1 | 12/2009 | Russell et al. | |
| 2010/0085035 A1 | 4/2010 | Fornage | |
| 2010/0088052 A1 | 4/2010 | Yin et al. | |
| 2010/0091532 A1 | 4/2010 | Fornage | |
| 2010/0106438 A1 | 4/2010 | Fornage | |
| 2010/0139945 A1 | 6/2010 | Dargatz | |
| 2010/0175338 A1 | 7/2010 | Garcia Cors | |
| 2010/0176771 A1 | 7/2010 | Fieldhouse et al. | |
| 2010/0181830 A1 | 7/2010 | Fornage et al. | |
| 2010/0195357 A1 | 8/2010 | Fornage et al. | |
| 2010/0214808 A1 | 8/2010 | Rodriguez | |
| 2010/0222933 A1 | 9/2010 | Smith et al. | |
| 2010/0236612 A1 | 9/2010 | Khajehoddin et al. | |
| 2010/0263704 A1 | 10/2010 | Fornage et al. | |
| 2010/0309695 A1 | 12/2010 | Fornage | |
| 2011/0012429 A1 | 1/2011 | Fornage | |
| 2011/0019444 A1 | 1/2011 | Dargatz et al. | |
| 2011/0043160 A1 | 2/2011 | Serban | |
| 2011/0049990 A1 | 3/2011 | Amaratunga et al. | |
| 2011/0051820 A1 | 3/2011 | Fornage | |

FOREIGN PATENT DOCUMENTS

| | | |
|---|---|---|
| CA | 2655007 A1 | 2/2009 |
| CA | 2693737 A1 | 2/2010 |
| DE | 20012131 U1 | 2/2001 |
| EP | 1803161 A1 | 4/2004 |
| EP | 1794799 A1 | 6/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | 2004008619 A1 | 1/2004 |
| WO | 2004100348 A1 | 11/2004 |
| WO | 2004100348 A8 | 12/2005 |
| WO | 2006048688 A1 | 5/2006 |
| WO | 2007080429 A2 | 7/2007 |
| WO | 2009081205 A2 | 7/2009 |
| WO | 2009081205 A3 | 10/2009 |
| WO | 2009134756 A1 | 11/2009 |

OTHER PUBLICATIONS

Kjaer, "Design and Control of an Inverter for Photovoltaic Applications," PhD Thesis, Aalborg University Institute of Energy Technology, 236 pages, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Selection of Topologies for the PHOTOENERGY™ Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

Kwon et al., "High-efficiency Module-integrated Photovoltaic Power Conditioning System," IET Power Electronics, doi: 10.1049/iet-pel.2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, Apr. 1991.

Sen et al., "A New DC-To-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l Conf. Power Electronics, vol. 1, pp. 559-564, 1996.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Ando et al, "Development of Single Phase UPS Having AC Chopper and Active Filter Ability," IEEE International Conference on Industrial Technology, 10.1109/ICIT.2006.372445, pp. 1498-1503, 2006.

Biel et al, "Sliding-Mode Control Design of a Boost-Buck Switching Converter for AC Signal Generation," vol. 51, issue 8, pp. 1539-1551, 2004.

Biel et al, "Sliding-Mode Control of a Single-Phase AC/DC/AC Converter," Proceedings of the 40th IEEE Conference on Decision and Control, vol. 1., pp. 903-907, Dec. 2001.

Bose et al, "Electrolytic Capacitor Elimination in Power Electronic System by High Frequency Filter," Conference Record of the 1991 IEEE Industry Applications Society Annual Meeting, vol. 1, pp. 869-878, 1991.

Bower et al, "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Bush, "UK Solar Firm Discloses Novel Inverter Topology," Electronics Weekly.com. Apr. 2011, last accessed Aug. 30, 2011 at http://www.electronicsweekly.com/Articles/2011/04/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved 2kw Solar Inverter With Wide Input Voltage Range," IEEE 10th Mediterranean Conference, MEleCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase Isolated Converter using a DC Active Filter with a Center Tap,"

Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

Jung et al., "High-frequency DC Link Inverter for Grid-Connected Photovoltaic System," Conference Record of the Twenty-Ninth IEEE Photovoltaic Specialists Conference, pp. 1410-1413, 2002.

Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.

Khajehoddin et al., "A Novel Topology and Control Strategy for Maximum Power Point Trackers and Multi-string Grid-connected PV Inverters," Applied Power Electronics Conference, APEC08, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.

Khajehoddin et al., "Distribution Power Generation Interface," U.S. Appl. No. 61/243,807, Sep. 18, 2009.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kjaer et al., "A Novel Single-Stage Inverter for the AC-module with Reduced Low-Frequency Ripple Penetration," EPE 2003, ISBN 90-75815-07-7, 10 pages, 2003.

Mutoh, Nobuyoshi, et al., "A Controlling Method for Charging Photovoltaic Generation Power Obtained by a MPPT Control Method to Series Connected Ultra-Electric Double Layer Capacitors," 8 pages.

* cited by examiner

MODULAR SYSTEM FOR UNATTENDED ENERGY GENERATION AND STORAGE

CROSS-REFERENCE TO RELATED U.S. PATENT APPLICATION

This application is a continuation application of U.S. application Ser. No. 11/615,074, now U.S. Pat. No. 7,994,657, entitled "MODULAR SYSTEM FOR UNATTENDED ENERGY GENERATION AND STORAGE," which was filed on Dec. 22, 2006, the entirety of which is hereby incorporated by reference.

GOVERNMENT RIGHTS

This invention was made with government support under Contract No. H92222-06-C-0002 awarded by the Department of Defense. The U.S. government has certain rights in the invention.

TECHNICAL FIELD

The invention relates, generally, to energy generation and storage systems and, more particularly, to a modular system for unattended energy generation and storage.

BACKGROUND

Remote sensors, isolated communication devices, distributed wireless networks, and a host of other unattended electrically-operated systems typically require for operation minimum levels of electrical energy. These unattended electrically-operated systems are generally unreachable by conventional electric power or utility grids. As such, alternative energy or power sources such as, for example, solar energy, wind energy, and geothermal energy, have increasingly been relied upon to supply their required electrical energy.

While a few of these unattended electrically-operated systems are geographically positioned to benefit from regular access and routine maintenance, others may be unsuitable for maintenance either because of difficult access, highly distributed arrangements, or excessive costs. In a variety of applications, limits on maintenance reflect a vast installation. Consider, for example, a border security application in which thousands of sensors are arrayed along hundreds of miles of frontier. In principle, an access road can be built and regular maintenance can be scheduled. In practice, there may be sections in which road access is problematic and the sensor array may be so vast that dedicated maintenance crews may have to be assigned continuously.

Another example is rural broadband access to the Internet or World Wide Web (WWW), in which one approach is a dispersed array of pole-mounted repeaters. If these repeaters can be set up with an "install and forget" strategy, service providers can substantially function without dedicated maintenance crews.

These unattended electrically-operated systems typically utilize energy storage devices or units, to maintain power availability at night, to help maintain operation through intervals of bad weather, and to allow the electrical load to draw power in short-term bursts that might exceed the delivery capability of their energy recharge unit generation or recharge units. Moreover, these unattended electrically-operated systems generally need power conversion and regulation to deliver reliable, consistent power independent of conditions on the energy recharge units or in the storage units.

In solar applications, conventional remote power systems use combinations of solar panels for energy recharge units and rechargeable batteries for energy storage units. Typically, batteries are connected directly to an output, while the solar panels are connected either through a diode or through a switching power converter. The direct use of batteries typically limits the degree of output regulation and does not provide for the longest possible life of these unattended electrically-operated systems. Thus, the battery terminals serve as the direct power output, in which case the only protection is a fuse. As such, the quality of output regulation is determined entirely by the battery and will follow wide tolerances.

These unattended systems typically lack reliability as battery charging processes are not properly managed. Overcharge and undercharge conditions can occur, especially during long periods of cloudy weather. Battery life is relatively limited as a result. If a short circuit blows a fuse, the system will be down until serviced. Multiple battery units may be interconnected, but there is no control mechanism for load sharing or balancing. Further, multiple battery units may be connected to a single output in a modular fashion, and protection and interaction between and among the batteries are not adequate. Thus, these unattended systems need to protect themselves as well as their batteries against output short circuits and other external faults.

In some unattended systems, either the energy recharge unit or the rechargeable storage unit is connected directly to a dc bus, and the other unit is connected through a dc-dc converter. As such, only one dc-dc converter is utilized while having independent control of the energy recharge unit and the rechargeable storage unit regardless of the serviced load. This arrangement supports an improved integration of recharge and storage over the basic solar panel and battery interconnections, but still does not resolve regulation or protection issues.

In other unattended systems, the energy recharge unit charges the storage unit, which then charges a capacitor, which is then switched into the load. In this arrangement, power flow from the energy recharge unit to the load goes through a series of device connections: the energy recharge unit, the storage unit, the capacitor, and then the load. This sequence of operations can result in extra power loss, especially during intervals in which the power from the energy recharge unit is well-matched to the load.

Therefore, a need exists for a modular system for unattended energy generation and storage that overcomes the problems noted above and others previously experienced for addressing issues of regulation, protection, interconnection, or modularity. These and other needs will become apparent to those of skill in the art after reading the present specification.

SUMMARY

The foregoing problems are solved and a technical advance is achieved by the present invention. Articles of manufacture and systems consistent with the present invention provide an apparatus or modular system for unattended energy generation and storage for supplying energy to a load. The apparatus includes an energy recharge unit, an energy storage unit, an energy converter connected to the energy recharge unit, the energy converter being capable of transferring energy at a power level from the energy recharge unit to an output node, the power level being determined by a power transfer controller, and a bi-directional energy converter connected to the energy storage unit and to the output node. The bi-directional energy converter is capable of converting energy of varying voltages from the energy storage unit to energy of varying current levels to supplement the transferred energy with energy from the energy storage unit so as to maintain a constant voltage on the output node. The bi-directional energy converter is capable of converting the transferred energy to provide charging energy to the energy storage unit when the transferred energy exceeds a demand level of the load while maintaining the constant voltage at the output node.

Articles of manufacture consistent with the present invention also provide a method of providing energy to a load from a power supply system. The power supply system includes an energy recharge unit, an energy converter with its input connected to the energy recharge unit and its output connected to an output node and coupled to a power transfer controller, a rechargeable energy storage unit, a bi-directional energy converter with its input connected to the rechargeable energy storage unit and its output connected to the output node, the output node being connected to an input of the load. The method exposes the energy recharge unit to a corresponding energy source so as to produce electric energy, determines via the power transfer controller whether a power level of the produced electric energy is above a predetermined power threshold in order to activate the energy converter, converts the produced electric energy by the energy converter and delivering the converted electric energy to the load in order to meet at least part of a demand level of the load, monitors a voltage at the output node. The method further converts energy stored in the energy storage unit by the bi-directional energy converter to supplement the delivery of the converted produced energy to the load so as to maintain the output node voltage at a predetermined voltage level, and converts the transferred energy to provide charging energy to the energy storage unit when the transferred energy exceeds a demand level of the load while maintaining the predetermined voltage level at the output node.

Other systems, apparatus, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.

Figure 1:
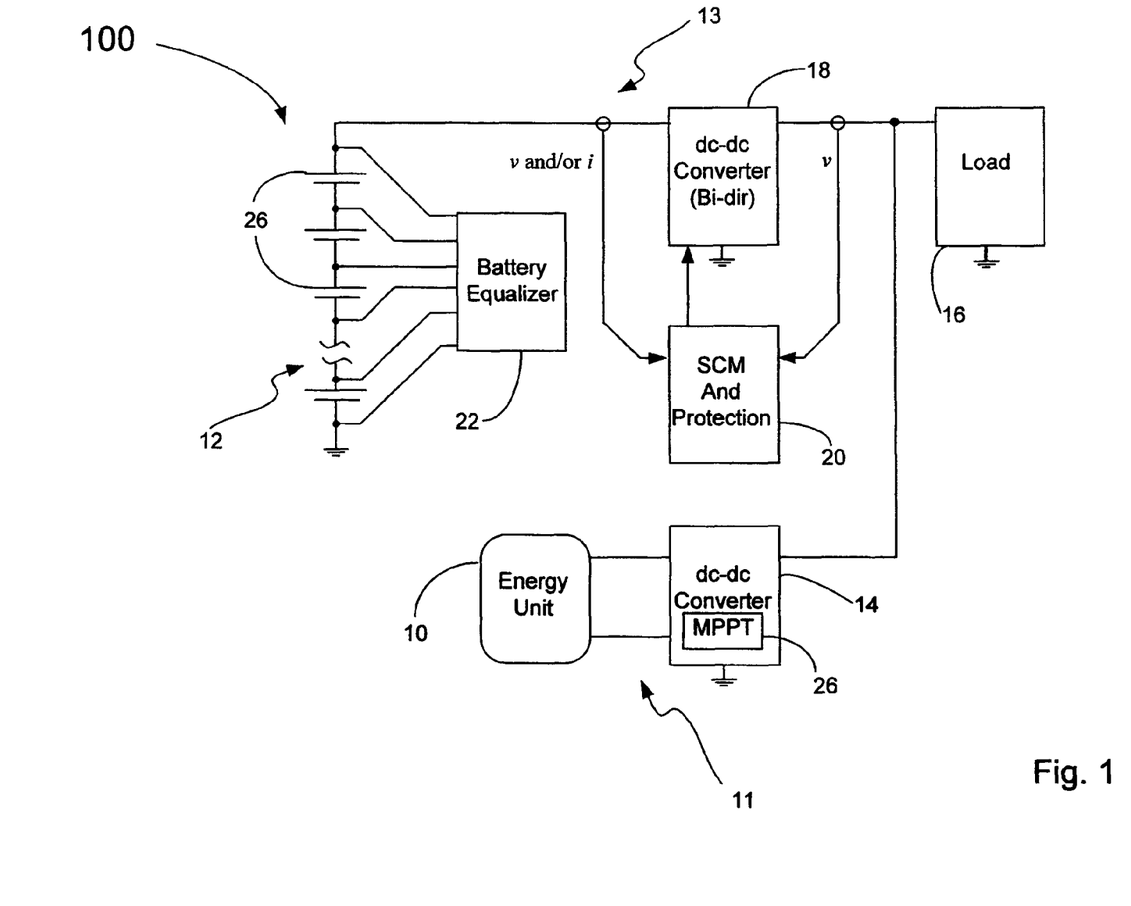
FIG. 1 is a schematic diagram illustrating one embodiment of a modular unattended system for energy generation and storage consistent with the present invention.

FIG. 1 depicts one embodiment of a modular system for unattended energy generation and storage or power supply apparatus 100 consistent with the present invention. The power supply apparatus 100 is a modular system that comprises an energy recharge device or unit 10 suitable for long-term operation and expected to provide variable energy, an energy storage device or unit 12 which is charged and recharged by the energy recharge unit 10, a switching power conversion circuit 14 that draws power when activated from the energy recharge unit 10 in a manner that addresses the needs of a load 16. The switching power conversion circuit 14 will be hereafter referred to as the recharge unit or source converter 14. The power supply apparatus 100 further comprises another switching power conversion circuit 18 that manages the energy storage unit 12 and maintains an output suitable for the variable or arbitrary electrical load 16. The switching power conversion circuit 18 will be hereafter referred to as the storage converter 18.

The power supply apparatus 100 is configured to enable energy delivery to the load 16 from the energy recharge unit 10 while also providing energy to the energy storage unit 12 so as to augment, if necessary, the energy stored in the energy storage unit 12 when sufficient recharge unit energy is available. The power supply apparatus 100 is also configured to enable energy delivery to the load 16 from the energy recharge unit 10 and/or from the energy storage unit 12 when the energy recharge unit 10 is unable to meet the energy needs of the load 16. The power supply apparatus 100 also prevents energy delivery to the load 16 when the charge level of the energy storage unit 12 falls below a minimum voltage threshold level so that all of the energy generated by the energy recharge unit 10 is supplied or made available to the energy storage unit 12 until the voltage of the energy storage unit 12 reaches this minimum voltage threshold level at which the storage converter 28 will operate at a minimum desired energy conversion efficiency level. As such, the energy recharge unit 10 can build up the amount of energy in the energy storage unit 12 first and then to deliver and maintain delivery of energy to the load 16 as well as to continue building up and maintaining energy in the storage energy unit 12 during periods when the energy recharge unit 10 is producing enough energy to do so.

The energy recharge unit 10 may be any kind of power or energy generating system, such as for example solar panel, solar cell, fuel cell, wind generator, rotary generator, etc. For the purposes of the present invention, the energy recharge unit 10 is a solar panel. One important feature is that the energy recharge unit 10 is configured to be controlled to maximize its performance and longevity. In the case of a solar or wind recharge unit, the control draws maximum available power whenever power is available and useful. In the case of a fuel cell or rotary generator, the control acts to maintain operation at an optimum power point, selected for the specific technology. The preferred application is an unattended long-term power supply, so those energy systems that require substantially no maintenance are most suitable. These would include solar photovoltaic panels, wind generators, small water wheels, or devices able to extract energy from the immediate surroundings. Almost all plausible energy recharge units 10 for this purpose have an identified optimum operating condition. As such, the energy recharge unit 10 uses a switching power converter controlled to enforce this optimum. This is intended to make the operation of the energy recharge unit 10 nearly independent from those of the load 16 and the energy storage unit 12.

In the preferred embodiment, the energy storage unit 12 is based on energy storage elements 26 such as ultracapacitors. Among electrical and electrochemical storage devices, ultracapacitors 26 are known to provide the highest number of charge and discharge cycles and to have long life as well. Other energy accumulators, especially secondary batteries but also devices such as flywheels or other rechargeable mechanical devices are applicable. Ultracapacitors 26 or batteries or other rechargeable elements may be used in series strings owing to their relatively low terminal voltages. To ensure long life, the individual storage elements in the series string need to be matched in voltage. Known balancing technology provides this function, which in turn assures the longest possible life. In ultracapacitors and certain battery types, notably lithium-ion rechargeable cells, life is further extended by limiting the charge voltage. Balancing technology allows the voltage to be set to any desired value, and can maintain balance even if a decreased voltage is desired. In the unattended power supply apparatus 100, the energy storage unit 12 may be controlled to permit operation even when the energy recharge unit 10 is unavailable, and is protected against both under-voltage and over-voltage to prevent failures.

The load 16 can be any kind of electric load, which requires electric power at a rate or magnitude that does not exceed the capacities of the energy storage unit 12 and the energy recharge unit 10 over time, or for which periods of nonuse during shortages of such capacities can be tolerated before the energy recharge unit 10 is re-energized and self-started. The energy recharge unit 10 and the energy storage unit 12 need to be suitable for the load 16 that may require either fairly steady or intermittent current. Moreover, the energy storage unit 12 needs to be able to accumulate enough energy capacity to power the load 16 for some periods of time during which the energy recharge unit 10 is incapable of doing so, for example, during the dark of night or during cloudy weather when the energy recharge unit 10 is a solar panel.

Now referring back to FIG. 1, the energy recharge unit 10 is connected to the source converter 14 such that energy or power generated or otherwise produced by the energy recharge unit 10 flows through the source converter 14 to the load 16 and to the storage converter 18 via the output node 24. The source converter 14 is a dc-dc switching power converter, and preferably a boost type dc-dc converter. The source converter 14 incorporates a maximum power point tracker (MPPT) or power controller 26, which serves to insure that the energy recharge unit 10 generates maximum power without regard to voltage at output node 24 or other conditions. When the energy recharge unit 10 is a solar panel, the source converter 14 (and its MPPT controller 26) functions only when solar energy is available, such as during daylight hours. That is, an internal processor (not shown) of the source converter 14 does not consume energy unless solar energy is available. This operational feature of the source converter 14 is accomplished by supplying the recharge unit converter controls from the panel of the energy recharge unit 10.

By incorporating the MPPT controller 26, the source converter 14 becomes a variable dc-dc converter that may use a control algorithm to force the terminals of the photovoltaic panel to an impedance that produces the maximum power out of the panel of the energy recharge unit 10. The MPPT controller 26 adjusts the panel operating point to extract maximum power on a moment-by-moment basis. This MPPT controller 26 may act entirely based on panel terminal characteristics so as to function irrespectively of the voltage at output node 24. As such, the source converter 14 does not disrupt voltage level or interfere with voltage regulation action elsewhere in the power supply apparatus 100. Many MPPT methods can be used, such as ripple correlation control, perturb-and-observe approaches or constant-voltage-fraction approaches.

The MPPT controller 26 is also configured to enforce a voltage limit and permit an external digital command to shut it down. Without such a limit or command, excess solar power may continue to be delivered from the energy recharge unit 10 even when the load 16 is light and the storage energy unit 12 is at full capacity. In this situation, solar energy is not needed, and there is a potential for overcharging the energy storage unit 12 or delivering excessive voltage at the output node 24. Moreover, when the produced energy falls below a predetermined energy level, the MPPT controller deactivates the source converter 14. Power tracking subject to a voltage limit and shutdown command is a known practice but has not been used previously with a separate parallel converter, such as the storage converter 18, which manages a different function.

As stated earlier, the energy storage unit 12 is connected to the output node 24 through the storage converter 18. The storage converter 18 is a bi-directional dc-dc boost converter configured to deliver a consistent or approximately constant output voltage level on the output node 24, regardless of its input voltage level. That is, even if the input voltage to the storage converter 18 varies, the output voltage of the storage converter 18 on the output node 24, which is supplied to the load 16, preferably remains approximately constant, which may be required by the load 16, especially if the load 16 includes a microprocessor or other logic controller that typically requires such a constant voltage input to avoid inconsistent or incorrect operation that may be caused by voltage fluctuations.

Typically, dc-dc voltage converters by nature have different conversion efficiency characteristics for different input voltages. At a low input voltage, the storage converter 18 may be so inefficient that it may drain all the power available from the energy storage unit 12 at a rate faster than the energy storage unit 12 and the energy recharge unit 10 can supply and still not be able to deliver the required constant voltage on the output node 24. In that condition, the power supply apparatus 100 may not power the load 16. Therefore, the storage converter 18 is activated only when its input voltage is high enough to operate efficiently and that the energy available from the energy storage unit 12 is sufficient for the storage converter 18 to deliver the required energy at the required constant voltage on output node 24 to operate the load 16. As such, the storage converter 18 is activated or controlled using a sensorless current mode (SCM) controller 20, with its primary objective being output voltage regulation. The SCM controller 20 is connected to the output of the energy storage unit 12 and to the output of the storage converter 18. Alternately, the SCM controller 20, which may include a processor programmed with operational instructions, may be incorporated into the storage converter 18.

In SCM control, an inductor current is reconstructed from voltage information. The inductor voltage in a dc-dc converter is typically a substantially larger signal than an output of a current sensor and its range does not change as a function of loading. In its simplest form, the SCM approach reconstructs the inductor current directly by integrating the inductor voltage. Alternately, current limiting can be enforced by means of a separate current sensor. As such, current can be limited from the energy storage unit 12 to limit an energy flow when the output node 24 is short-circuited or overloaded.

Other control methods, such as voltage-mode or current-mode controls, can be used if they are properly designed to reject energy variations, although SCM has known advantages based on noise rejection and wide operating range.

Using the SCM controller 20, the storage converter 18 can be controlled to produce a substantially constant voltage at the output node 24. In effect, the storage converter 18 can deliver whatever current is needed to maintain the substantially constant voltage. If the current of the energy recharge unit 10 exceeds the current amount required by the load 16, the storage converter 18 takes the excess and acts to deliver it to the energy storage unit 12 at the actual capacitor voltage level. If the current of the energy recharge unit 10 is insufficient for the load 16, the storage converter 18 acts to take current from the energy storage unit 12 and to maintain the load with constant voltage output. Thus, the storage converter 18 manages the current to take on whatever value is needed (positive or negative) at any given moment to maintain the constant voltage at output node 24 and support the load 16.

Moreover, the SCM controller 20 can monitor energy buildup in the energy storage unit 12 and detects when the voltage in the energy storage unit 12 reaches or exceeds a minimum threshold level. More specifically, the SCM controller 20 may prevent any energy generated by the energy recharge unit 10 and any energy in energy storage unit 12 from being delivered to the load 16 until such time as the energy storage unit 12 has reached a minimum threshold of energy storage or a minimum charge level.

As stated above, in FIG. 1 the energy storage unit 12 uses the ultracapacitors 26, which can deliver extreme cycle counts, 100,000 or more, thus supporting decades of daily or even more frequent cycles. These ultracapacitors 26 have limited voltage ratings, typically 2.3 to 2.7 V each, so they are used in series combinations in most storage applications. In series combinations, a charge imbalance is reflected as a voltage imbalance, and it is imperative to make sure the highest voltage in the series string stays below the operating limit. Furthermore, life extension can be obtained if an even lower voltage limit is enforced. Similar limitations based on voltage apply to batteries, which can be used in place of ultracapacitors 26 with only minor circuit modifications.

In the embodiment of FIG. 1, the energy storage unit 12 is coupled to an equalizer 22. The equalizer 22 can guarantee that each of the ultracapacitors 26 has a corresponding voltage that is a correct fraction of the total string voltage. Thus, if there are 5 ultracapacitors 26 in series and the total voltage is 10.0 V, then each individual ultracapacitor 26 is within a few millivolts of 2.0 V. The use of the equalizer 22 enables the monitoring and enforcement of capacitor voltage limits and the management of the energy storage unit 12. The inclusion of the equalizer 22, especially to facilitate reduced-voltage operation, is an advantageous aspect of the invention.

As shown in FIG. 1, the power supply apparatus 100 can be subdivided into two subsystems 11 and 13 and the load 16. Namely, an energy recharge unit or recharge subsystem 11 which includes the energy recharge unit 10 and the source converter 14 with its MPPT controller 26, and an energy storage subsystem 13 which includes energy storage unit 12, the equalizer 22 and the storage converter 18 with its SCM controller 20.

An advantageous feature of the power supply apparatus 100 is that the system-level power converter control, which includes controls incorporated into the source converter 14 and the storage converter 18, decouples the action of the individual subsystems 11 and 13. This allows the two subsystems 11 and 13 to interact in a simple and parallel manner without introducing control challenges. The basic action is that the energy recharge unit 10 is controlled for power flow, the output node 24 is controlled for fixed voltage, and the current to and from the energy storage unit 12 is controlled to make up any differences.

As both the energy recharge subsystem 11 and the energy storage subsystem 13 supply the load 16 in parallel, the solar energy produced does not go through multiple power processing stages on its way to the load 16. Moreover, as the output node 24 need not be connected directly either to the energy storage unit 12 or to the energy recharge unit 10, each of the intervening dc-dc converters 14 and 18 manages the needs of the corresponding subsystems 11 and 13 while delivering regulated output power to the output node 24 that serves the load 16. This arrangement of the power supply apparatus 100 can be termed a "virtual bus" structure.

Figure 2A:
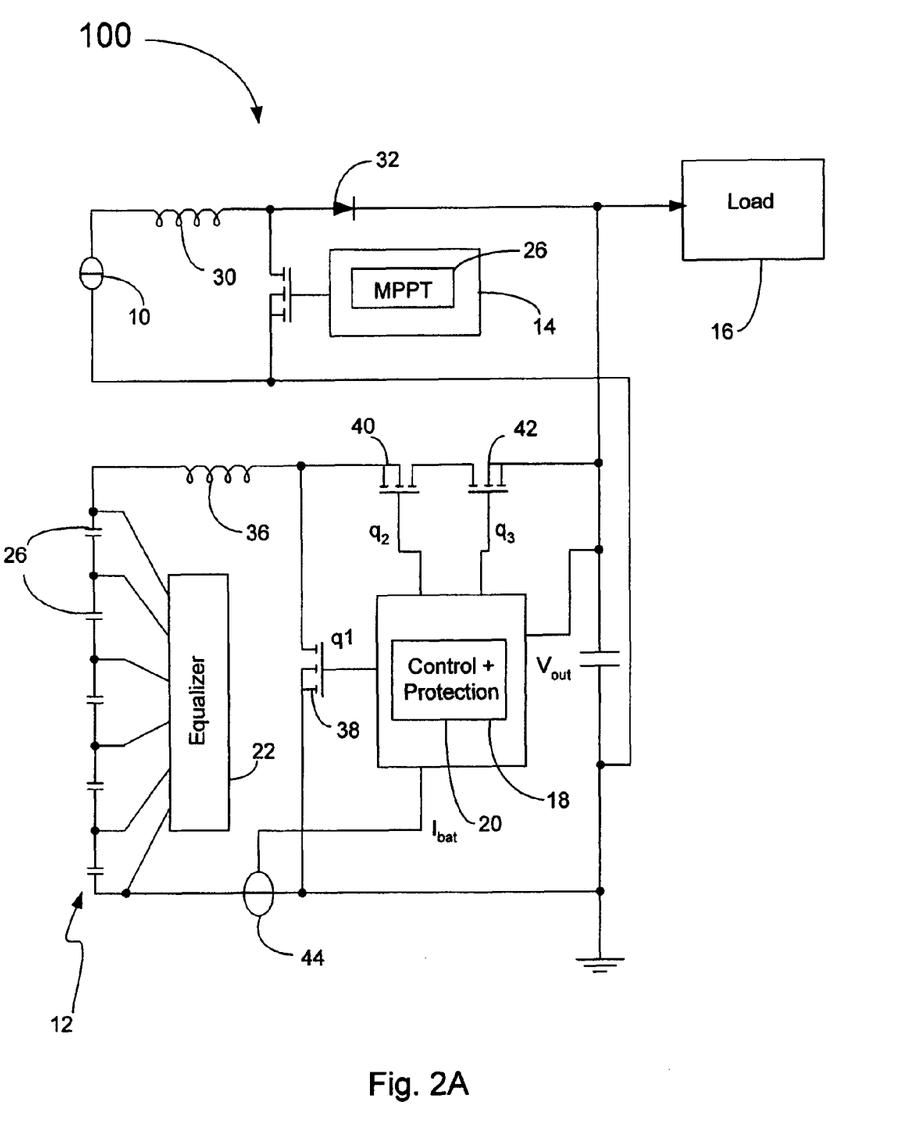
FIGS. 2A and B are schematic diagrams illustrating the modular unattended system for energy generation and storage of FIG. 1 with protection elements consistent with the present invention.
Figure 2B:
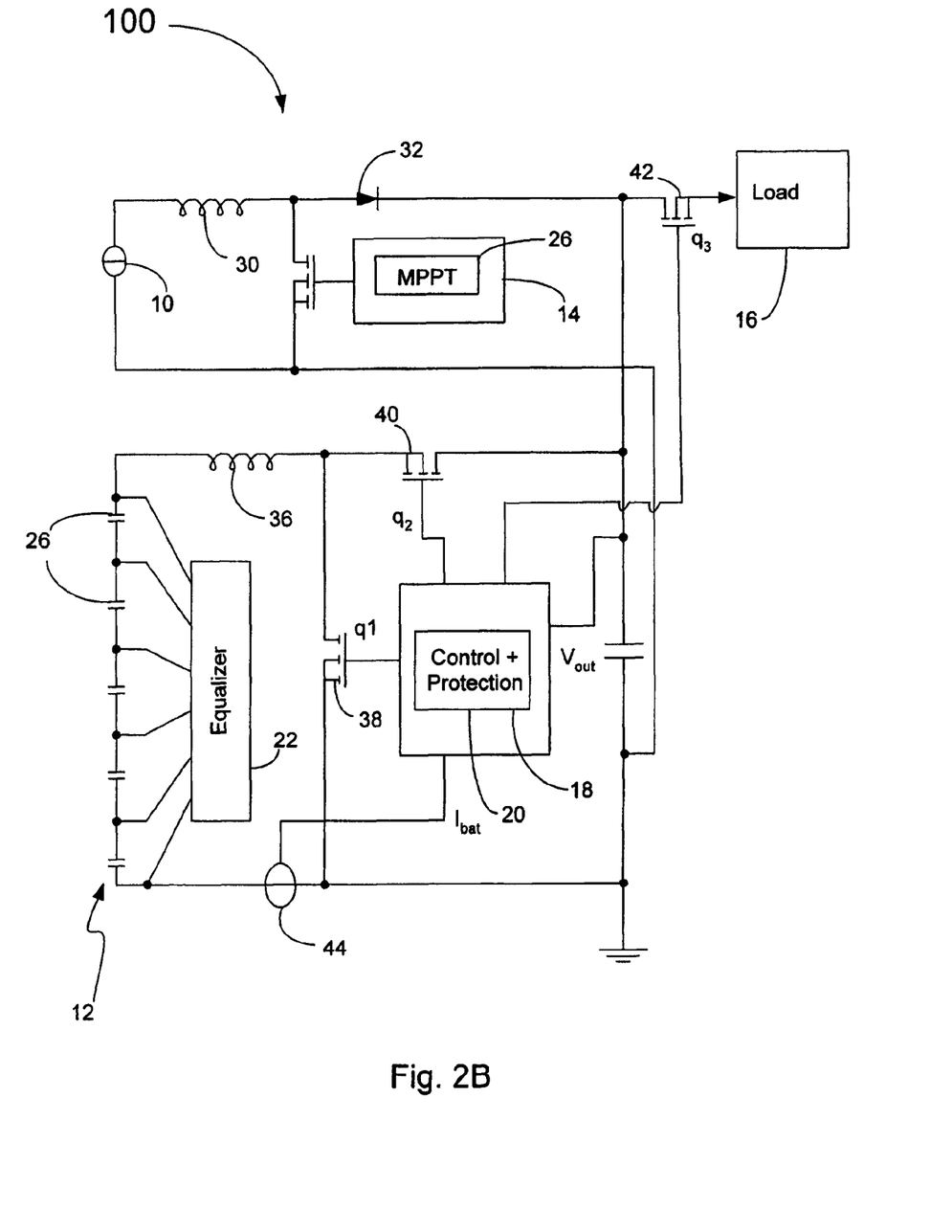

Now referring to FIGS. 2A and B, another embodiment of the power supply apparatus 100 of FIG. 1 is illustrated with protection elements consistent with the present invention. As shown, the subsystem 11 now includes an inductor element 30 connected at the output of the energy recharge unit 10, a unidirectional element 32, such as a diode, connected in series between the inductor element 30 and the load 16, and a switching element $q_4$ 34 connected in parallel with the energy recharge unit 10 and the inductor 30. The switching element $q_4$ 34, which can also be referred as the recharge unit switch $q_4$ 34, is coupled for switching operations to the source converter 14.

As shown in FIGS. 2A and B, the subsystem 13 includes an inductor element 36 connected at the output of the storage unit 12, and a switching element $q_1$ 38 connected in parallel with the storage rechargeable unit 12 and the inductor element 36. The switching element $q_1$ 38 may be a field-effect transistor (FET) or metal-oxide semiconductor FET (MOSFET). The recharge unit switch $q_1$ 38, is coupled for switching operations to the storage converter 18. Additionally, as shown in FIG. 2A two other switching elements $q_2$ 40 and $q_3$ 42 are connected in series between the inductor element 36 and the output node 24, and coupled for switching operations to the storage converter 18. The switching elements $q_2$ 40 and $q_3$ 42 may be field-effect transistors (FET) or metal-oxide semiconductor FETs (MOSFET). Alternately, the switching elements $q_3$ 42 may be positioned between the output node 24 and the load 16, as shown in FIG. 2B. Moreover, a current sensor 44 is used to supply a value of a current $I_{bat}$ of the energy storage unit 12 to the storage converter 18.

Figure 3:
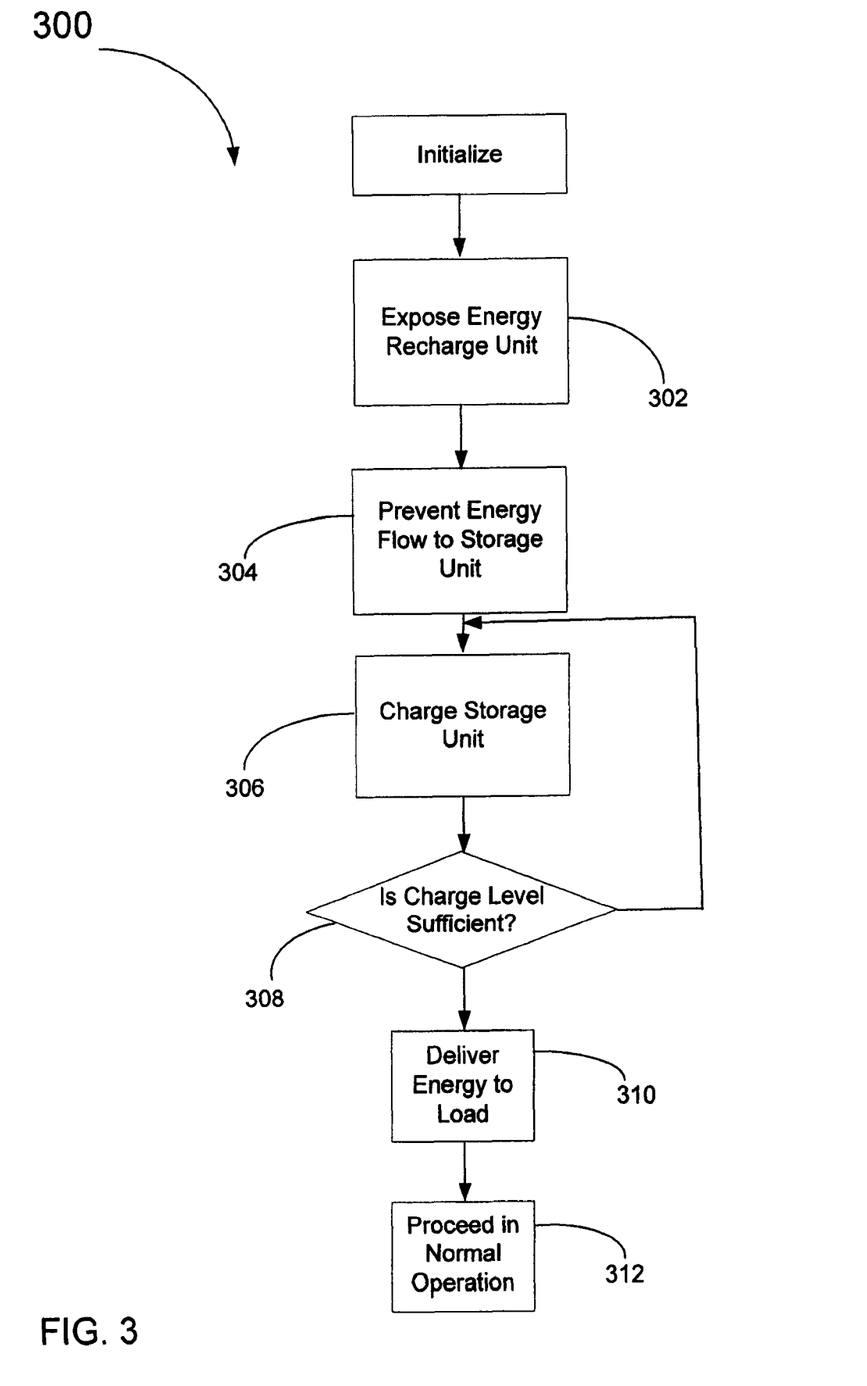
FIG. 3 is a flow chart illustrating a method for an initial start-up of the modular unattended system for energy generation and storage of FIG. 1 consistent with the present invention.

Now referring to FIG. 3, a flow chart 300 illustrates a method for an initial start-up of the power supply apparatus 100 of FIG. 1 consistent with the present invention. The energy storage converter 18 is configured with its SCM controller 20 to manage the start up procedure. At an initial start-up of the power supply apparatus 100, the energy recharge unit 10 being a solar cell is exposed to available sunlight in step 302, and the energy storage unit 12 is in this initial condition has no stored energy charge or only a very low amount of stored energy or charge. Upon initial start up of the power supply apparatus 100 in this configuration, the storage converter 18 prevents any energy converted by the source converter 14 from being delivered to the load 16, at step 304. That is, the storage converter 18 ensures that all of the energy generated by the energy recharge unit 10 is flowing to the energy storage unit 12, at step 306. The storage converter 18 manages this power flow and prevents excessive starting current by means of a hardware limit on the duty ratio of recharge unit switch $q_1$ 38. Once the energy storage unit 12 reaches a minimum threshold for its energy level, at step 308, the storage converter 18 allows the energy generated by the energy recharge unit 10 to be delivered to the load 16, at step 310, while a remainder of the energy generated, if any, is supplied to the energy storage unit 12 so that the energy level in the energy storage unit 12 continues to increase. That is, once the voltage of the energy storage unit 12 has exceeded the minimum allowed threshold (minimum operating energy level), then the power supply apparatus 100 may supply the load 16 (i.e. enter normal operation), at step 312. Moreover, as stated above during normal operation the energy storage unit 12 can supply the energy required by the load 16 when the energy recharge unit 10 cannot generate sufficient energy to operate the load 16.

Moreover, when the energy storage unit 12 is discharged to below the minimum allowed operating energy level, that is, its terminal voltage is low, The recharge unit switch $q_1$ 38 is turned off and a diode (not shown) allows energy to flow into but not out of the energy storage unit 12. Conversely, when the energy storage unit 12 is completely charged (maximum allowed operating energy level), that is, its terminal voltage is high, the storage converter 18 sends a disable signal to shut off the source converter 14. In this circuit condition, the switching element $q_2$ 40 is also turned off and the diode (not shown) allows only energy to flow out of but not into the energy storage unit 12.

Figure 4:
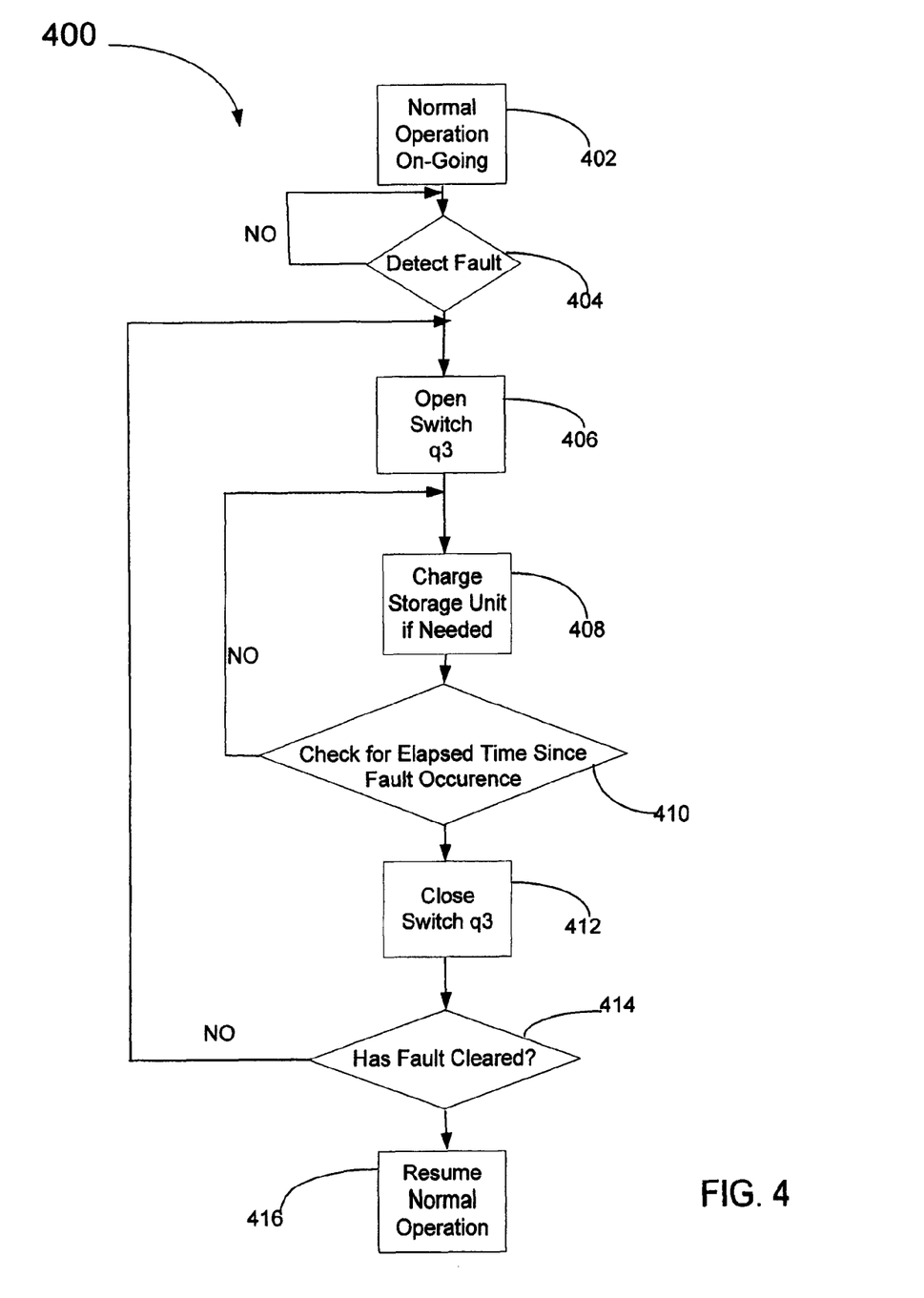
FIG. 4 is a flow chart illustrating a method for detecting and mitigating a fault disturbing an on-going operation of the modular unattended system for energy generation and storage of FIG. 1 consistent with the present invention.

Now referring to FIG. 4, a flow chart 400 illustrates a method for detecting and mitigating a fault disturbing an on-going operation of the power supply apparatus 100 of FIG. 1 consistent with the present invention. As shown in FIGS. 2A and B, the output protection switching element $q_3$ 42, which may be provided in alternate positions, allows the energy storage subsystem 13 to be completely disconnected if a problem occurs. This is an unusual arrangement in a dc-dc converter and may be a unique aspect in this particular application. Further, an automatic recovery procedure programmed in the processor of the storage converter 18 to restore power if a short-term output problem appears during normal operation, at step 402, is described below.

If a short circuit is detected occurring at the output node 24, at step 404, the protection switch $q_3$ 42 disconnects immediately, at step 406. Switch ratings are chosen so the protection switch $q_3$ 42 can interrupt a maximum short-circuit current. As such, the energy stored in the ultracapacitors 26 will not dissipate into the short circuit. When this switch $q_3$ 42 is open the storage subsystem 13 can charge when sufficient voltage is available, at step 408, because a reverse parallel diode (not shown) connected with switch $q_3$ 42 permits inflow but not outflow. The storage subsystem 13 may not discharge until a fault recovery sequence is completed. The protection switch $q_3$ 42 also opens if the capacitor voltage falls below a lower limit or threshold, indicating possible undercharge so as to protect the energy storage subsystem 13 against total energy loss if a fault occurs. Energy remains available, and allows the power supply system apparatus 100 to recover normal operation immediately when the fault is gone and the energy recharge unit 10 is once again delivering power. After determining if a predetermined amount of time has elapsed, at step 410, and once the fault clears, the storage converter 18 enters a recovery mode. At step 412, the switch $q_3$ 42 is turned on and the storage converter 18 begins providing energy to the output node 24. At step 414, a check is made as to whether the fault is still present. In the affirmative, switch $q_3$ 42 turns off again. Otherwise, the output voltage at output node 24 starts to come up and normal operation resumes, at step 416.

Another advantageous protection feature of the invention is the positioning of the unidirectional element or diode 32 in the recharge unit subsystem 11. This diode 32 is provided at an output of the energy recharge unit 10 to prevent current from flowing toward it. That is, the diode 32 permits current outflow but not inflow toward the energy recharge unit 10. In this embodiment of the power supply apparatus 100, no additional protection switching element is provided between the energy recharge unit or solar panel 10 and the load 16, because solar panels are inherently current limited. That is, a short-circuit current is typically only slightly higher than the rated output current of the power supply apparatus 100. As such, short circuit conditions do not result in excessive current flows, and the source converter 14 and its MPPT controller 26 may not need to be shut-off because as discussed above a separate process programmed in the storage converter 18 manages the recovery process from a short circuit condition.

In summary, the combination of power-based tracking control for the source converter 14 and SCM control for the storage converter 18 is an advantageous feature of the invention. These two controls work together in a highly useful manner. The MPPT controller 26 acts to maximize power from the energy recharge unit 10 no matter what voltage is present at the output node 24. The SCM controller 20 acts to regulate the voltage no matter what the power. As a result, undesired dynamic interactions are avoided. When the energy recharge unit 10 is able to deliver extra power, this power flows into the energy storage unit 12 without any extra intentional effort. When the energy recharge unit 10 is insufficient or absent, energy flows from the energy storage unit 12 to maintain the desired voltage at the output node 24. The two controls can be designed independently, and work together in a manner that is highly beneficial for the modular arrangement of the power supply apparatus 100. The only added aspect needed to avoid undesired interactions is to address the condition when the energy storage unit 12 reaches its "full" state or charge. In this case, extra power input to this modular system is not useful. Under this condition, which is sensed easily by confirming that the energy storage unit 12 has reached its voltage limit, the energy storage converter 18 sends a signal to shut off the source converter 14. The energy recharge unit 10 will not turn back on until its power is again useful to the modular system or power supply apparatus 100. As such, the energy storage unit 12 is managed with both upper and lower voltage limits to prevent overcharge and undercharge. A limited charge range is essential for high reliability. A current limit is enforced both on the energy storage subsystem 11 and at the output node 24. If the output current becomes excessive, then the protection device $q_2$ 40 temporarily shuts off the output.

This control combination is advantageous because it delivers excellent output regulation no matter how power is flowing in the power supply system apparatus 100. Since the power flow is uncertain and highly variable, it is essential that the regulation function be carried out in a manner independent of flows, directions, and other factors. The SCM controller 20 is able to carry out its function even when short-term load peaks are applied to the power supply system apparatus 100. An advantage is that highly variable loads that require intermittent power can be handled without special problems with this power supply system apparatus 100. Loads with consistent, constant power needs are also handled without trouble.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. An electrical power supply for supplying power to an electrical load, the electrical power supply comprising:

a solar panel;
an energy storage capacitor electrically coupled to the solar panel;
a power conversion system having an input electrically coupled to the solar panel and an output configured to be electrically coupled to the electrical load, wherein the power conversion system is configured to supply power to the electrical load in short-term bursts, wherein each short-term burst includes a first time period in which power is supplied to the electrical load and a second time period in which substantially no power is supplied to the electrical load; and
a controller configured to control the power conversion system according to a maximum power point tracking (MPPT) method to substantially maximize the power drawn from the solar panel and exchange power with the energy storage capacitor to maintain the voltage of the energy storage capacitor above a predetermined threshold.

2. The electrical power supply of claim 1, wherein the controller comprises a controller configured to achieve a predetermined minimum energy conversion efficiency level of the power conversion system by exchanging power with the energy storage capacitor to maintain the voltage of the energy storage capacitor above the predetermined threshold.

3. The electrical power supply of claim 1, wherein the controller is configured to control the power conversion system according to a ripple correlation MPPT method.

4. The electrical power supply of claim 1, wherein the controller is configured to control the power conversion system according to a perturb-and-observe MPPT method.

5. The electrical power supply of claim 1, wherein the controller is configured to control the power conversion system according to a constant-voltage-fraction MPPT method.

6. The electrical power supply of claim 1, wherein the power conversion system is configured to supply power to the electrical load in short-term bursts in response to a weather condition that causes the solar panel to produce less power.

7. The electrical power supply of claim 1, wherein the power conversion system comprises a first direct current-to-direct current (DC-DC) converter electrically connected to the energy storage capacitor and the output of the power conversion system.

8. The electrical power supply of claim 1, wherein the power conversion system comprises a second DC-DC electrically connected to the input of the power conversion system and to the output of the power conversion system.

9. An electrical power supply for supplying power to an electrical load, the electrical power supply comprising:
a solar panel to generate an input power;
an energy storage capacitor electrically coupled to the solar panel;
a power conversion system having an input electrically coupled to the solar panel and an output configured to be electrically coupled to the electrical load; and
a controller configured to control the power conversion system according to a maximum power point tracking (MPPT) method to substantially maximize the power drawn from the solar panel and control the power conversion system to supply energy to the electrical load in short-term bursts, wherein each short-term burst has (i) a first time period in which the power conversion system supplies substantially no power to the electrical load and stores energy in the energy storage capacitor and (ii) a second time period in which the power conversion system supplies energy from the energy storage capacitor to the electrical load, wherein the input power of the solar panel is less than a required power of the load during the second time period.

10. The electrical power supply of claim 9, wherein the first time period occurs while a charge level of the energy storage capacitor is less than a minimum threshold and the second time period occurs while the charge level of the energy storage capacitor is greater than the minimum threshold.

11. The electrical power supply of claim 9, wherein the controller is further configured to exchange power with the energy storage capacitor to maintain the voltage of the energy storage capacitor above a predetermined threshold.

12. The electrical power supply of claim 11, wherein the controller comprises a controller configured to achieve a predetermined minimum energy conversion efficiency level of the power conversion system by exchanging power with the energy storage capacitor to maintain the voltage of the energy storage capacitor above the predetermined threshold.

13. The electrical power supply of claim 9, wherein the controller is configured to control the power conversion system according to a ripple correlation MPPT method.

14. The electrical power supply of claim 9, wherein the controller is configured to control the power conversion system according to a perturb-and-observe MPPT method.

15. The electrical power supply of claim 9, wherein the controller is configured to control the power conversion system according to a constant-voltage-fraction MPPT method.

16. The electrical power supply of claim 9, wherein the controller is configured to the power conversion system to store energy in the energy storage capacitor during the first time period in response to a weather condition that causes the solar panel to produce less power.

17. The electrical power supply of claim 9, wherein the power conversion system comprises a first direct current-to-direct current (DC-DC) converter electrically connected to the energy storage capacitor and the output of the power conversion system.

18. The electrical power supply of claim 9, wherein the power conversion system comprises a second DC-DC electrically connected to the input of the power conversion system and to the output of the power conversion system.

19. A method for controlling an electrical power supply electrically coupled to a electrical load, the method comprising:
controlling a power conversion system of the electrical power supply to draw power from a solar panel according to a power point tracking method to substantially maximize the power drawn from the solar panel; and
supplying energy to the electrical load in short-term bursts, wherein each short-term burst includes (i) a first time period in which energy generated by the solar panel is stored in an energy storage capacitor of the electrical power supply such that substantially no energy is supplied to the electrical load during the first time period; and a second time period in which energy is supplied from the energy storage capacitor to the electrical load, wherein the power generated by the solar panel is less than a required power of the electrical load during the second time period.

20. The method of claim 19, wherein:

causing energy generated by the solar panel to be stored in the energy storage capacitor comprises causing energy generated by the solar panel to be stored in the energy storage capacitor of the electrical power supply while a charge level of the energy storage capacitor is less than a minimum threshold, and causing energy to be supplied from the energy storage capacitor to the electrical load comprises causing energy to be supplied from the energy storage capacitor to the electrical load during while the charge level of the energy storage capacitor is greater than the minimum threshold.

* * * * *